US012092312B2

(12) United States Patent
Yoo

(10) Patent No.: US 12,092,312 B2
(45) Date of Patent: Sep. 17, 2024

(54) LIGHTING DEVICE FOR TABLE CAPABLE OF REMOVING SHADE FORMED IN LIGHTING OBJECT

(71) Applicant: HYUNDAI FOMEX CO., LTD., Seoul (KR)

(72) Inventor: Jae Kyun Yoo, Seoul (KR)

(73) Assignee: HYUNDAI FOMEX CO., LTD., Seoul (KR)

( * ) Notice: Subject to any disclaimer, the term of this patent is extended or adjusted under 35 U.S.C. 154(b) by 0 days.

(21) Appl. No.: 18/488,103

(22) Filed: Oct. 17, 2023

(65) Prior Publication Data

US 2024/0280253 A1 Aug. 22, 2024

(30) Foreign Application Priority Data

Feb. 21, 2023 (KR) ........................ 10-2023-0022869

(51) Int. Cl.
*F21V 33/00* (2006.01)
*F21V 21/30* (2006.01)
*F21V 23/06* (2006.01)
*F21Y 115/10* (2016.01)

(52) U.S. Cl.
CPC .......... *F21V 33/0012* (2013.01); *F21V 21/30* (2013.01); *F21V 23/06* (2013.01); *F21Y 2115/10* (2016.08)

(58) Field of Classification Search
CPC ...... F21V 33/0012; F21V 21/30; F21V 23/06; A47B 19/10
See application file for complete search history.

(56) References Cited

U.S. PATENT DOCUMENTS 6,588,915 B1 7/2003 Chen

FOREIGN PATENT DOCUMENTS

| | | |
|---|---|---|
| KR | 10-2012-0005909 A | 1/2012 |
| KR | 10-1405680 B1 | 6/2014 |
| KR | 10-2015-0007444 A | 1/2015 |
| KR | 10-1793656 B1 | 11/2017 |
| KR | 20-2018-0002824 A | 10/2018 |
| KR | 10-2021-0069935 A | 6/2021 |
| KR | 10-2022-0011958 A | 2/2022 |

OTHER PUBLICATIONS

Office Action issued in KR 10-2023-0022869; mailed by the Korean Intellectual Property Office on May 17, 2023.

*Primary Examiner* — Karabi Guharay
(74) *Attorney, Agent, or Firm* — Studebaker & Brackett PC

(57) ABSTRACT

Disclosed is a lighting device for a table, which supplies light toward a shade of a lighting object such that a shade formed in the vicinity of the neck of the lighting object due to a lighting of a ceiling installed in an interior space, such as a studio, in which an image of a subject is photographed or a space, such as a stage, for a lecturer.

9 Claims, 13 Drawing Sheets

LIGHTING DEVICE FOR TABLE CAPABLE OF REMOVING SHADE FORMED IN LIGHTING OBJECT

CROSS-REFERENCE TO RELATED APPLICATIONS

A claim for priority under 35 U.S.C. § 119 is made to Korean Patent Application No. 10-2023-0022869 filed on Feb. 21, 2023 in the Korean Intellectual Property Office, the entire contents of which are hereby incorporated by reference.

BACKGROUND

Embodiments of the inventive concept described herein relate to a lighting device for a table, which is installed in a table to remove a shade formed in a lighting object, such as a subject or a lecturer, and more particularly, relate to a lighting device for a table, which supplies light toward a shade of a lighting object such that a shade formed in the vicinity of the neck of the lighting object due to a lighting of a ceiling installed in an interior space, such as a studio, in which an image of a subject is photographed or a space, such as a stage, for a lecturer.

With development of the internet technology, many people are increasingly uploading their pictures or videos on the internet, and in this situation, solo content creation broadcasting is growing explosively around the world, offering various profit structures, such as a system that generates profit by using advertisements that appear when a video is played.

In particular, multi-channel networks (MCNs) are developing online solo broadcasting into a sustainable business, and creators are developing various video contents and working to acquire good equipment and excellent editing skills to gain more subscribers. Some video content creators on the most active YouTube channels have monthly incomes that exceed the annual salary of an ordinary office worker.

To shoot videos, which are the basis for producing such video contents, a camera and a lighting device are required, and the camera is basically fixed on a tripod or by using a gimbal, and the lighting device is mainly a basic lighting installed on the ceiling and additional lightings may be installed in front of a lighting object.

In particular, among the many factors that affect the quality of videos obtained by photographing a subject, the most important and influential one is lighting, and videos of very different qualities may be created according to a location of the lighting device that provides lighting to the subject.

Meanwhile, with the development of the online environments, it has become possible to watch real-time religious events, ceremonies, lectures, and the like through videos. In general, overall lighting is installed with lighting devices evenly arranged on the ceiling, and side lighting devices are installed on both sides so that a ratio of maximum and minimum illuminations on a stage floor or a space does not exceed 3:1.

FIGS. 1 and 2 are schematic views illustrating a shade formed in a lighting object when light toward a table is irradiated.

When general lighting is used in this way, shadows are formed in the vicinity of the neck of a lecturer, disrupting concentration of viewers and audiences.

Accordingly, to increase the visual effect for viewers and audiences and improve the quality of video contents, there is a need to develop a device that prevents shadows (S) from being formed on the bodies of creators or lecturers who are subject to lighting.

SUMMARY

Embodiments of the inventive concept provide a lighting device for a table that may improve an image of a lighting object by preventing a shade from being formed at a portion of a body of the lighting object located above a stage or under a lighting due to light emitted from a lighting device installed on a ceiling to the lighting object, and may enhance a quality of image contents.

According to an aspect of the inventive concept, a lighting device for a table includes a housing having a light transmitting surface which light transmits, having a lighting seating recess divided into three or more transverse rows such that brighter light is irradiated to a shadow intensive area, formed to have an inner area, in which a first row of lighting seating recess is smaller than a second row of lighting seating recess, and formed to have an inner area, in which the second row of light seating recess is smaller than a third row of lighting seating recess, a lighting part installed in an interior of the housing, and that irradiates light toward a vicinity of a neck, which is below the eyes of the lighting object to remove a shade formed at the vicinity of the neck of the lighting object, a power source part installed in the housing, and that receives a turning-on/off signal of the lighting part to turn on and off the lighting part, a brightness adjusting part installed in the housing, and that receives a brightness adjusting signal of the lighting part to adjust a lighting intensity of the lighting part, and an adapter part installed in the housing, and coupling the housing to the table.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, a lighting device for a table (hereinafter, briefly referred to as "the lighting device for a table") that may remove a shade that is formed in a lighting object according to preferred embodiments of the inventive concept will be described in detail.

Figure 1:
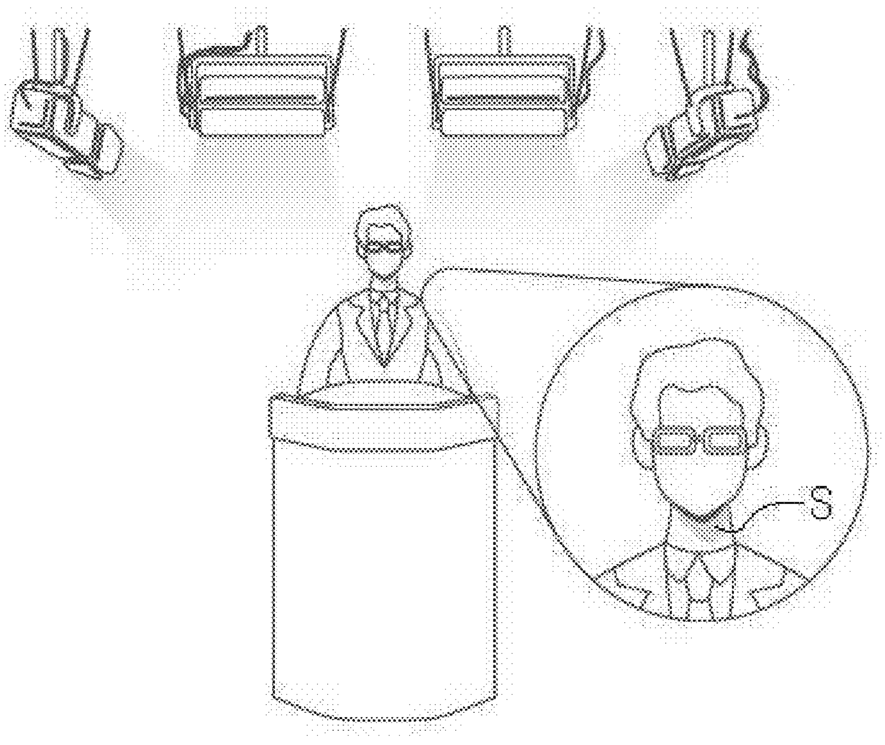
FIGS. 1 and 2 are schematic views illustrating a shade formed in a lighting object when light toward a table is irradiated.
Figure 2:
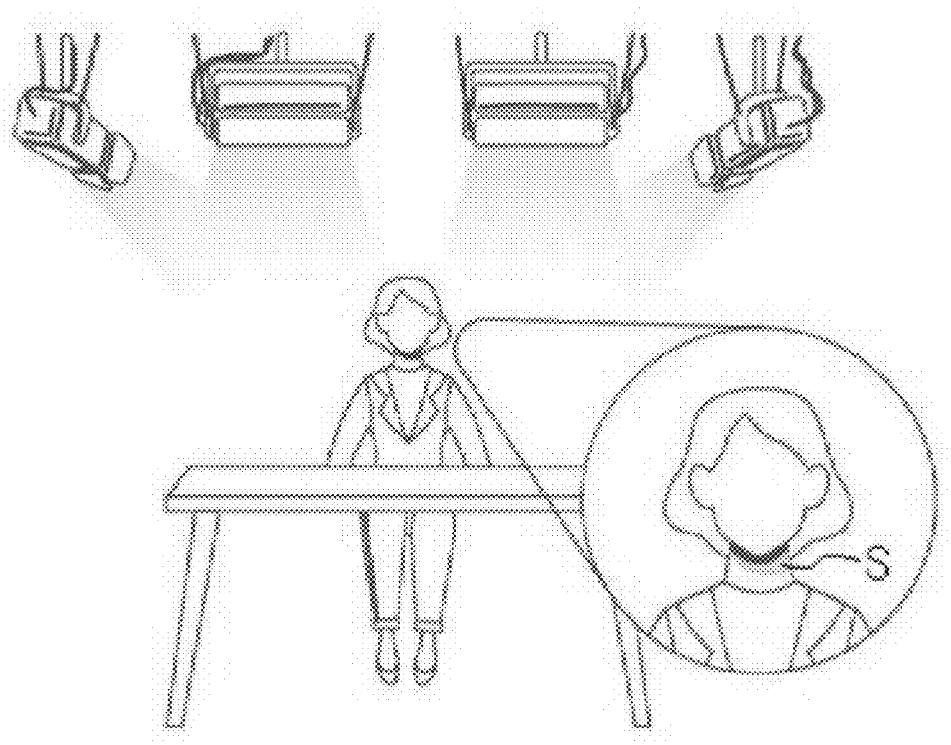
Figure 3:
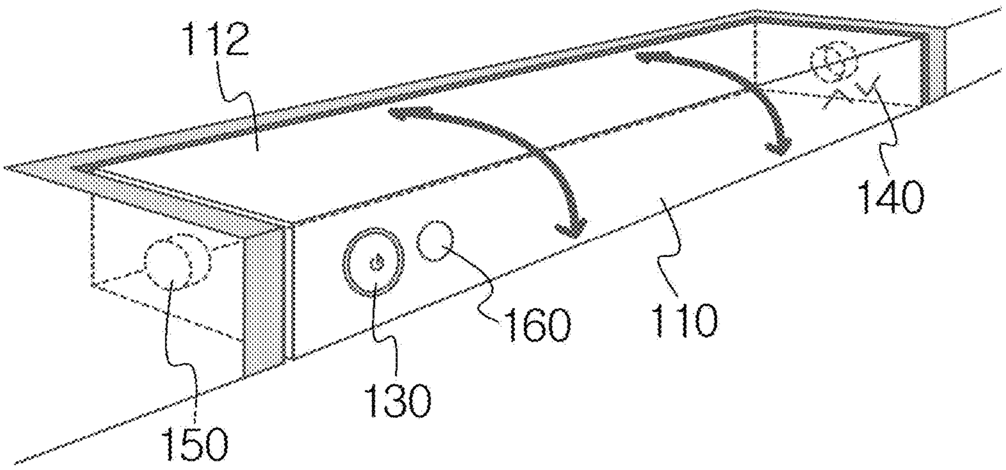
FIG. 3 is a perspective view illustrating a lighting device for a table according to a first embodiment of the inventive concept.
Figure 4:
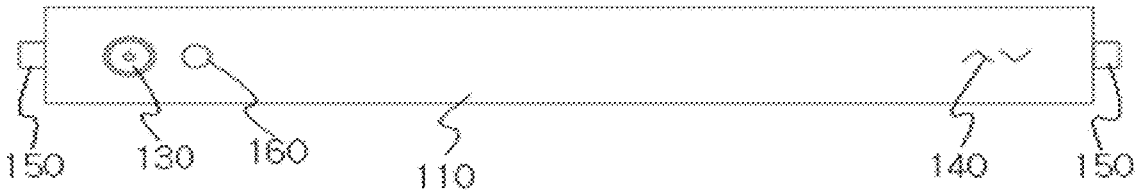
FIG. 4 is a front view illustrating the lighting device for a table of FIG. 3.
Figure 5:
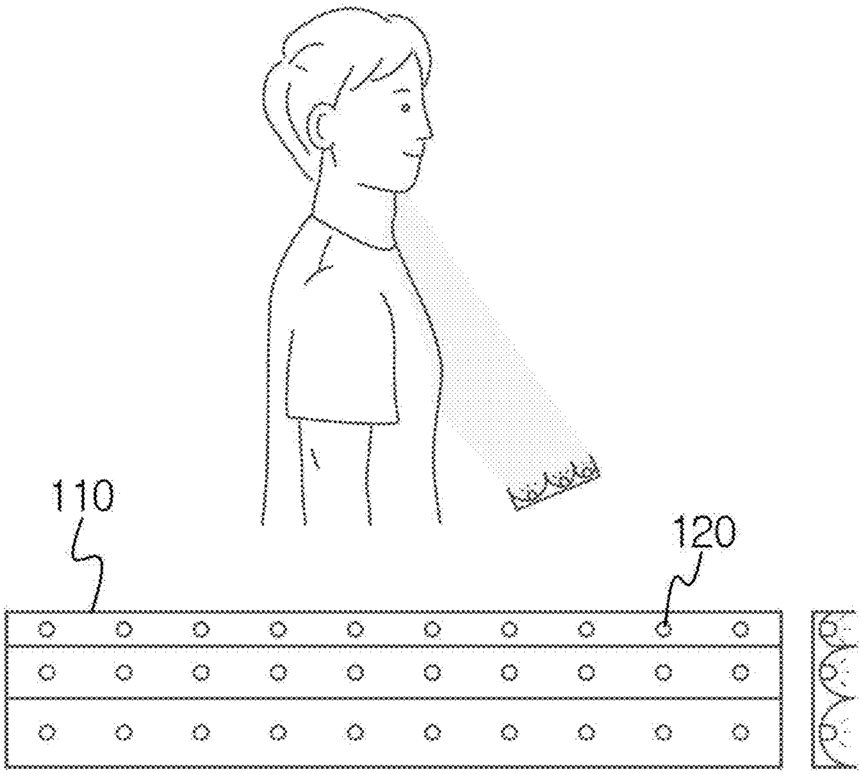
FIG. 5 is a schematic view illustrating a lighting device for a table of the inventive concept, which emits light toward a lighting object.
Figure 6:
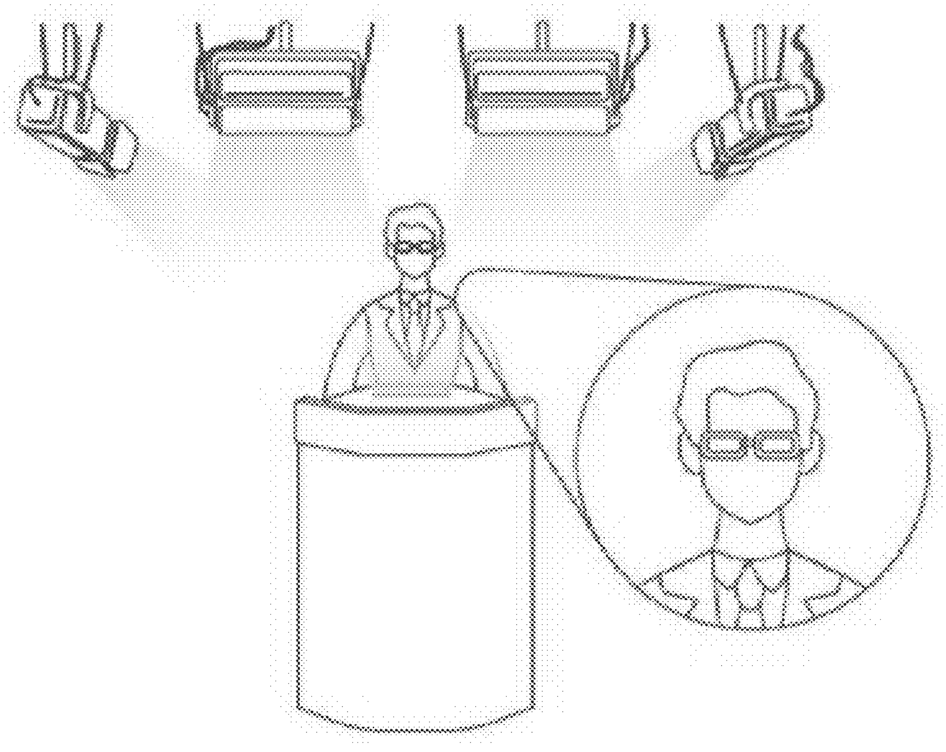
FIGS. 6 and 7 are partially enlarged front views illustrating a lighting device for a table of the inventive concept, which emitting light toward a lighting object.
Figure 7:
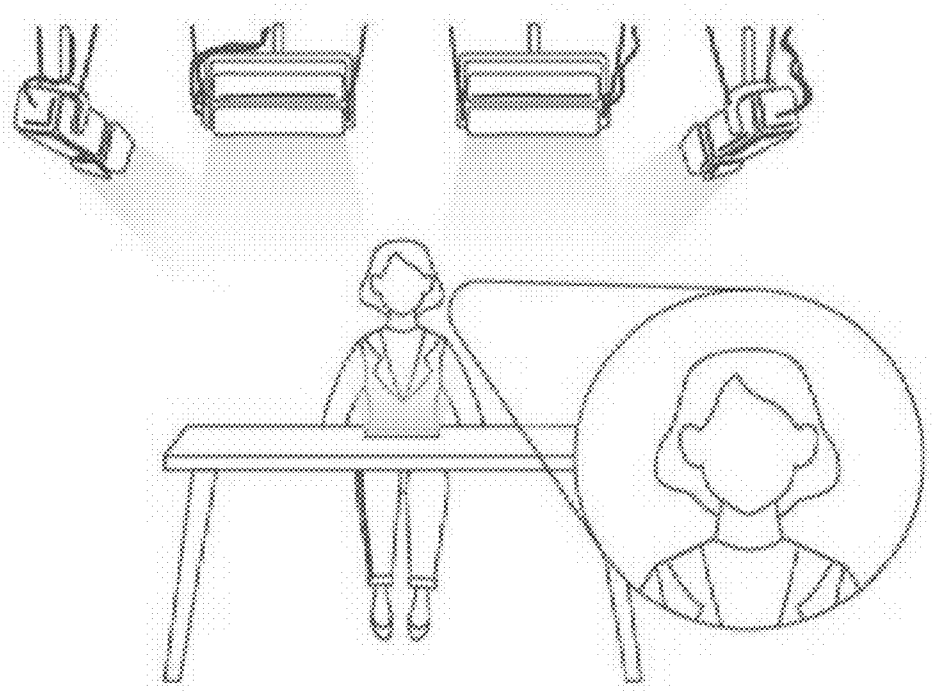

FIG. 3 is a perspective view illustrating a lighting device for a table according to a first embodiment of the inventive concept, FIG. 4 is a front view illustrating the lighting device for a table of FIG. 3, FIG. 5 is a schematic view illustrating the lighting device for a table of the inventive concept, which emits light toward a lighting object, and FIGS. 6 and 7 are partially enlarged front views illustrating the lighting device for a table of the inventive concept, which emitting light toward the lighting object.

Referring to FIGS. 3 to 5, a lighting device 100 for a table according to the inventive concept is attached to a table that is a filming prop to irradiate light to a vicinity of a neck of a lighting object, such as a lecturer or a solo media creator, and includes a housing 110, in which a light transmitting surface is formed, a lighting part 120 that irradiates light in an interior of the housing 110, a power source part 130 that is exposed to an outside of the housing 110 to control turning-on/off of the lighting part 120 according to a turning-on/off signal of the lighting part, a brightness adjusting part 140 that is exposed to the outside of the housing 110 to control a lighting intensity of the lighting part 120 according to a brightness adjusting signal of the lighting part, and an adapter part 150 that couples the housing 110 to a table that is a filming prop.

The lighting device 100 for a table provides an effect of a shade "S" not being formed at a vicinity of the neck of a lighting object because it may irradiate light from the table to the vicinity of the neck of the lighting object as illustrated in FIGS. 6 and 7 even though the table that is a filming prop shields the light irradiated from the lighting device installed on a floor.

Hereinafter, components will be described in more detail with reference to the accompanying drawings.

Figure 8:
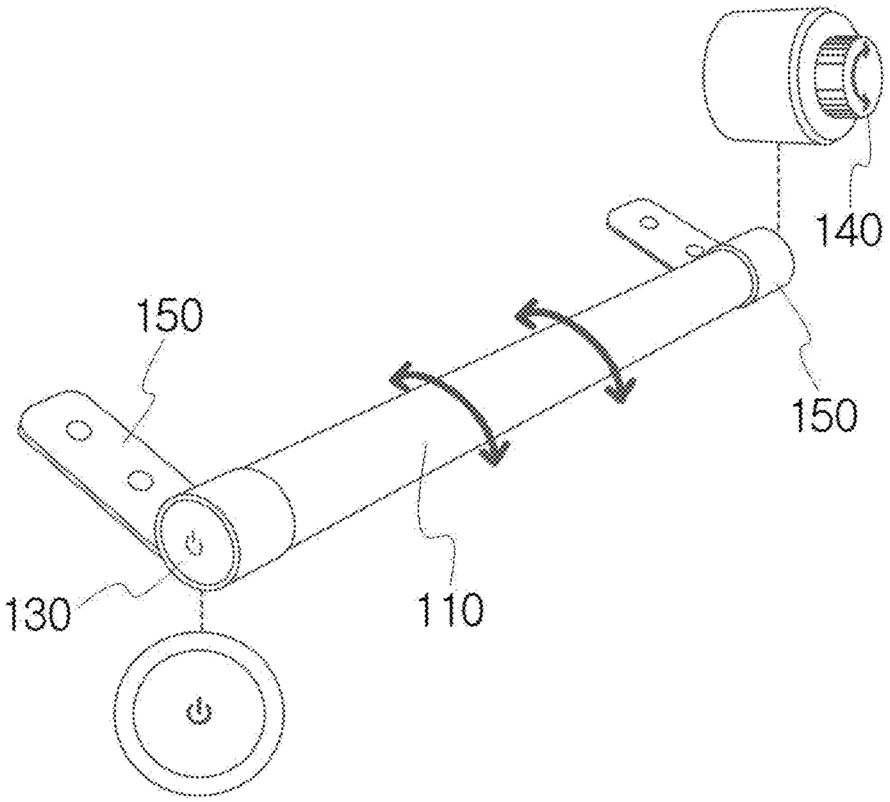
FIG. 8 is a perspective view illustrating a lighting device for a table according to a second embodiment of the inventive concept.
Figure 9:
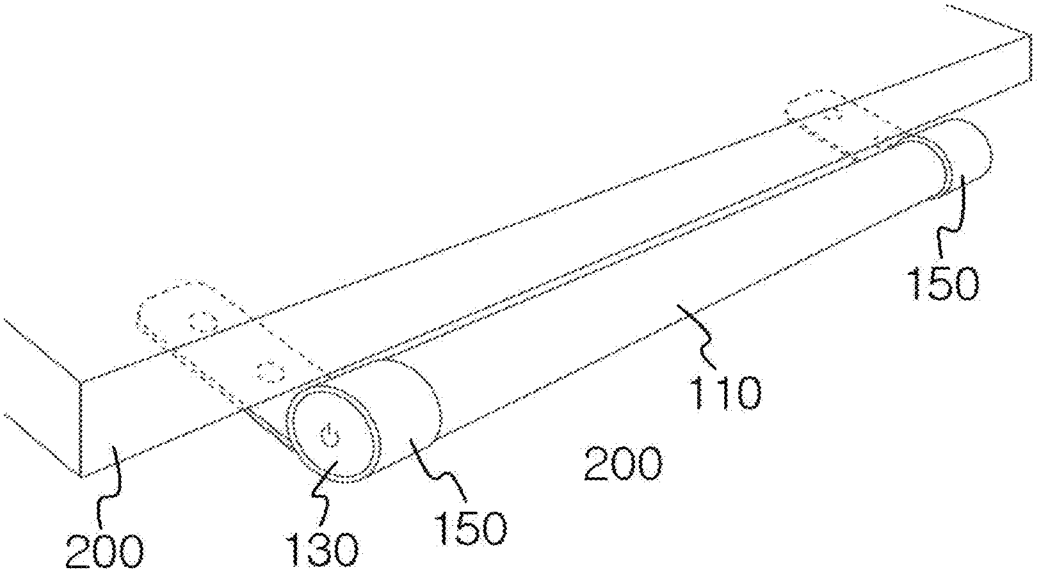
FIG. 9 is a perspective view illustrating a table, in which the lighting device for a table of FIG. 8 is installed.
Figure 10:
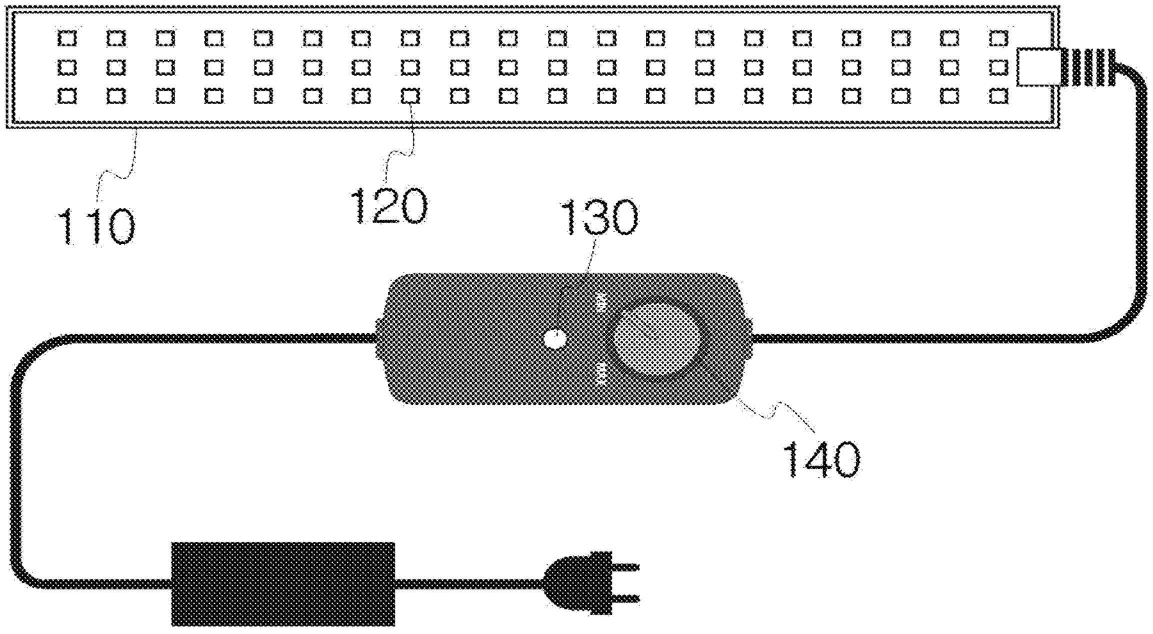
FIG. 10 is a plan view illustrating a lighting device for a table according to a third embodiment of the inventive concept.

FIG. 8 is a perspective view illustrating a lighting device for a table according to a second embodiment of the inventive concept, FIG. 9 is a perspective view illustrating a table, in which the lighting device for a table of FIG. 8 is installed, and FIG. 10 is a plan view illustrating a lighting device for a table according to a third embodiment of the inventive concept.

Referring to FIGS. 3 to 5, the lighting device 100 for a table according to the inventive concept includes the housing 110.

The housing 110 provides an external appearance of the lighting device 100 for a table while providing a space, in which detailed components of the lighting device 100 for a table, and a light transmitting surface 112 is formed to transmit light.

The housing 110 may be formed to have a rectangular parallelepiped block structure as illustrated in FIGS. 3 and 4, may be formed to have a cylindrical structure as illustrated in FIGS. 8 and 9, may be formed with a pair of sheets that are attached to each other as illustrated in FIG. 10.

An upper surface of the housing 110 formed to have the rectangular parallelepiped block structure may be the light transmitting surface 112. Then, the housing 110 may have a light shielding surface, of which other surfaces than an upper surface are formed of a metal or a synthetic resin. Furthermore, a light reflecting sheet for reflecting the light irradiated from the lighting part 120 may be provided on inner surfaces of the remaining surfaces, except for the light transmitting surface.

If necessary, the light seating recess divided into a plurality of transverse rows may be formed in the housing 110 having the rectangular parallelepiped block structure such that brighter light may be irradiated to the shadow intensive area. In detail, the housing 110 may have three or more light seating recesses having "U"-shaped upper and lower cross-sections in an interior thereof, the first row of light seating recess may be formed to have an inner area that is smaller than that of the second row of lighting seating recess, and the second row of lighting seating recess may be formed to have an inner area that is smaller than that of the third row of lighting seating recess.

The housing 110 formed to have the cylindrical structure may include a housing (110) body that has a rod-shaped structure, a first assembling socket that is coupled to a left side surface of the housing (110) body, and a second assembling socket that is coupled to a right side surface of the housing (110) body.

The housing (110) body may have the light transmitting surface on an entire surface thereof, and the first and second assembling sockets may have a light shielding surface formed of a metal or a synthetic resin on an entire surface thereof. Then, the inner side surfaces of the first and second assembling sockets may be provided with a light reflecting sheet for reflecting the light irradiated from the lighting part 120. Furthermore, the first and second assembling sockets may be formed to have a cup structure, of which a side surface facing the housing (110) body is opened such that the housing (110) body is inserted thereinto to be attached.

The housing 110 having the pair of sheets may include a first sheet and a second sheet that is attached to an upper surface of the first sheet. Then, the first sheet may be formed of a flexible synthetic resin such that a light shielding cross-section is formed on an entire surface thereof, and the second sheet may be formed of a flexible synthetic resin such that the lighting part 120 is provided between the first sheet and the second sheet whereby the light transmitting surface may be formed on the entire surface thereof.

In detail, the first sheet may be formed of a flexible material that may be folded with no directionality, may be formed of an electrically insulating material that insulates electricity flowing through a circuit line, and may be formed of a fiber that may endure a temperature of more than 250° C. In detail, it is preferable that the first sheet is formed of aromatic polyamide (aramid) fibers, polyimide fibers, novoloid fibers, carbon fibers, fluorine fibers, or a blend thereof. If the first sheet is not formed of fibers capable of enduring temperatures of more than 250° C., the main sheet may carbonize or shrink when reflow treatments of performing heating at a temperature of 150 to 250° C. and then performing cooling such that a current-conducting adhesive in contact with the lighting part 120 is cured.

The second sheet is attached to an upper surface of the first sheet to protect the lighting part 120 mounted on the first sheet and the circuit line provided in the first sheet, and is formed of a sheet that may transmit the light emitted from the lighting part 120. This front sheet may be formed of a synthetic resin, such as polyvinyl chloride (PVC), polyethylene terephthalate (PET), polyethylene naphthalate (PEN), polybutylene terephthalate (PBT), polypropylene (PP), polyethylene (PE), high-density polyethylene (HDPE), low-density polyethylene (LDPE), or linear low-density polyethylene (LLDPE) to be folded together with the first sheet by an external sheet. Furthermore, the second sheet may prevent a short-circuit from being generated as the circuit line is moved even when an external impact is applied because movement of the circuit line and the lighting part 120 are restricted.

If necessary, the second sheet may include a diffusion sheet that softly diffuses the light emitted from the lighting part 120 to irradiate the light to the lighting object. Furthermore, the second sheet may have the same size as that of the first sheet to cover a front surface of the first sheet.

Referring to FIG. 5, the lighting device 100 for a table according to the inventive concept includes the lighting part 120.

The lighting part 120 is installed in an interior of the housing 110 to generate light with electric energy that is supplied from an outside, and functions to irradiate the light to the lighting object to remove a shade such that no shade is formed in the vicinity of the lighting object.

The lighting part 120 may include a flexible LED board including a plurality of LED modules or may include a plurality of LED modules that are connected to the circuit line.

The flexible LED board may include a printed circuit board that is installed in the housing 110, and an LED module that is mounted on the printed circuit board.

If necessary, a plurality of printed circuit boards are disposed to be spaced part from each other on the same line in the interior of the housing 110, and are electrically connected to each other through a wire or the like. Here the printed circuit boards are disposed to be spaced apart from each other on the same line to allow the printed circuit boards to be folded according to an external force. In other words, the printed circuit boards, on which the plurality of LED modules are mounted, are electrically connected to each other while not being integrally formed but being arranged at locations that are spaced apart from each other to allow the lighting device to be folded when the lighting device is transported.

Meanwhile, the LED modules may include single LEDs, such as a red LED, a green LED, and a blue LED to adjust color temperatures, or may include RGB LEDs.

Referring to FIGS. 3 and 4, the lighting device 100 for a table according to the inventive concept includes the power source part 130.

The power source part 130 is installed in the housing 110, and receives a turning-on/off signal of the lighting part 120 to turn on and off the lighting part 120. To achieve this, the power source part 130 is electrically connected to the lighting part 120 to provide electric power supplied from an outside to the lighting part 120 according to a turning-on/off signal.

An on/off button that cuts off the electric power supplied from the outside may be installed in the power source part 130. Then, the power source part 130 provides the electric power supplied from the outside to the lighting part 120 such that the lighting part 120 is turned on according to the first touch or a pressing signal from the outside, and stops supply of the electric power not to provide the electric power supplied from the outside to the lighting part 120 such that the lighting part 120 is turned off according to the second touch or a pressing signal from the outside.

In a first aspect, the power source part 130 according to the inventive concept may be installed on a front surface of the housing 110 as illustrated in FIGS. 3 and 4 when the housing 110 has the rectangular parallelepiped block structure.

In a second aspect, the power source part 130 according to the inventive concept may be installed at one end of the housing 110 as illustrated in FIGS. 8 and 9 when the housing 110 has a cylindrical structure.

In a third aspect, the power source part 130 according to the inventive concept may be installed on the outside of the housing 110 to be connected to the lighting part 120 provided in the interior of the housing 110 as illustrated in FIG. 10 when the housing 110 includes a pair of sheets.

Referring to FIGS. 3 and 4, the lighting device 100 for a table according to the inventive concept includes the brightness adjusting part 140.

The brightness adjusting part 140 is installed in the housing 110 to be electrically connected to the lighting part 120, and receives a brightness adjusting signal of the lighting part 120 and adjusts a lighting intensity of the lighting part 120.

In a first aspect, the brightness adjusting part 140 according to the inventive concept may be installed on a front surface of the housing 110 as illustrated in FIGS. 3 and 4 when the housing 110 has a rectangular parallelepiped block structure. Then, the brightness adjusting part 140 includes an up button and a down button, and increases or decreases the lighting intensity of the lighting part 120 by one step for each according to the brightness adjusting signal input from the outside.

In a second aspect, the brightness adjusting part 140 according to the inventive concept may be installed at an opposite end of the housing 110, which is opposite to the one end of the housing 110, at which the power source part 130 is installed, as illustrated in FIGS. 8 and 9 when the housing 110 has a cylindrical structure. Then, the brightness adjusting part 140 may be a rotary dimming device.

In a third aspect, the brightness adjusting part 140 according to the inventive concept may be installed on the outside of the housing 110 to be connected to the lighting part 120 provided in the interior of the housing 110 as illustrated in FIG. 10 when the housing 110 has a pair of sheets. In this way, when the power source part 130 and the brightness adjusting part 140 are formed by an integral control signal input means, the control signal input means may be provided with a socket that may be inserted into a receptacle connected to the lighting part 120.

Referring to FIGS. 3 and 4, the lighting device 100 for a table according to the inventive concept includes the adapter part 150.

The adapter part 150 is installed in the housing 110 to couple the housing 110 to the table, and the adapter part may be implemented by any coupling means as long as the purpose may be achieved.

In a first aspect, the adapter part 150 according to the inventive concept may be cylindrical bosses that are provided at opposite distal ends of the housing 110 such that the housing 110 is rotated while being inserted into the assembling recess formed in the table as in FIGS. 3 and 4. Then, when the assembling recess formed in the table has a rectangular parallelepiped block structure, the housing 110 also has a rectangular parallelepiped block structure to be inserted into the assembling recess so as not to protrude when not being used. According to the lighting device 100 for a table including the adapter part 150, an irradiation direction of the light may be adjusted when the user rotates the housing 110.

In a second aspect, the adapter part 150 according to the inventive concept may include a first coupling ring that is mounted to surround an outer peripheral surface of the housing 110, a first attachment part that is fixed to the first coupling ring and has a flat plate structure to be attached to the table, a first assembling means that couples the first attachment plate to the table such that the first attachment plate is fixed to the table, a second coupling ring that is spaced apart from the first coupling ring and is mounted to surround the outer peripheral surface of the housing 110, a second attachment plate that is fixed to the second coupling ring and has a flat plate structure to be attached to the table, and a second assembling means that couples the second attachment plate to the table such that the second attachment plate is fixed to the table. The lighting device 100 for a table including the adapter part 150 may be conveniently attached to a lower surface or an upper surface of the table even when no assembling recess is formed in the table as in FIG. 9.

In a third aspect, the adapter part 150 according to the inventive concept may include an adhesion tape. The lighting device 100 for a table including the adapter part 150 may be conveniently attached to an upper surface of the table even when no assembling recess is formed in the table as in FIG. 10.

Figure 11:
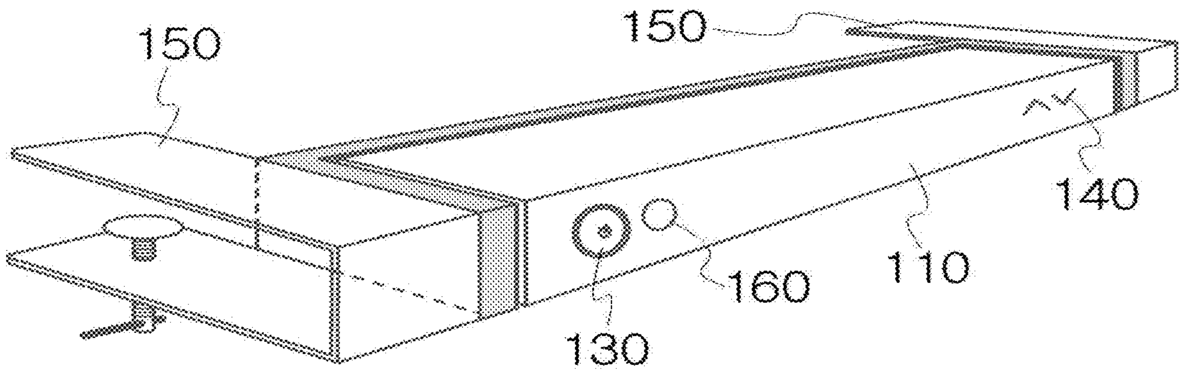
FIG. 11 is a perspective view illustrating a lighting device for a table according to a fourth embodiment of the inventive concept.

FIG. 11 is a perspective view illustrating the lighting device 100 for a table according to a fourth embodiment of the inventive concept. As a fourth aspect, the adapter part 150 according to the inventive concept may include cylindrical bosses that are provided at opposite distal ends of the housing 110 such that the housing 110 is rotated, an adapter part, in which cylindrical recesses are formed on opposite ends thereof such that the cylindrical bosses are assembled therewith, a first clip part that is installed on one side of the adapter part and has a stapler-shaped structure to be inserted into and coupled to a front side of the table, and a second clip part that is installed on an opposite side of the adapter part and has a stapler-shaped structure to be inserted into and coupled to the front side of the table. The lighting device 100 for a table including the adapter part 150 may be conveniently attached to a front surface of the table even when no assembling recess is formed in the table as in FIG. 11.

Referring to FIGS. 3 and 4, the lighting device 100 for a table according to the inventive concept may further include a color adjusting part 160.

The color adjusting part 160 is installed in the housing 110, and receives a color changing signal of the lighting part 120 to change a color of the lighting part 120.

As an aspect, the color adjusting part 160 according to the inventive concept may be installed on a front surface of the housing 110 as illustrated in FIGS. 3 and 4 when the housing 110 is formed to have a rectangular parallelepiped structure. Then, the color adjusting part 160 has a single button, and changes a lighting color in a specific sequence according to a color changing signal that is input from the outside.

The lighting device 100 for a table according to the inventive concept may further include a DMX connector (not illustrated).

The DMX connector is installed in the housing 110, and is connected to a lighting controller installed on an outside by wire or wirelessly to transmit a control signal of the lighting controller to the lighting part 120.

The DMX connector constructs an environment, in which the lighting object does not directly control the lighting part 120 but a separate lighting operator may control the lighting part 120 in a remote site through the lighting controller.

The lighting device 100 for a table according to the inventive concept may further include a shade managing part (not illustrated).

The shade managing part is installed in the housing 110 to detect a shade that is formed in an input surface of the light irradiated from the lighting part 120, and automatically adjusts the lighting intensity of the lighting part 120 according to a brightness of the input surface.

In detail, the shade managing part includes a photometer that detects a brightness (lux) of the input surface by detecting a shade (brightness) that is formed on the input surface of the light irradiated from the lighting part 120, and a control module that analyzes the brightness provided from the photometer to control the lighting part 120 such that an intensity of the lighting part 120 increases when the collected brightness is lower than a specific brightness.

Figure 12:
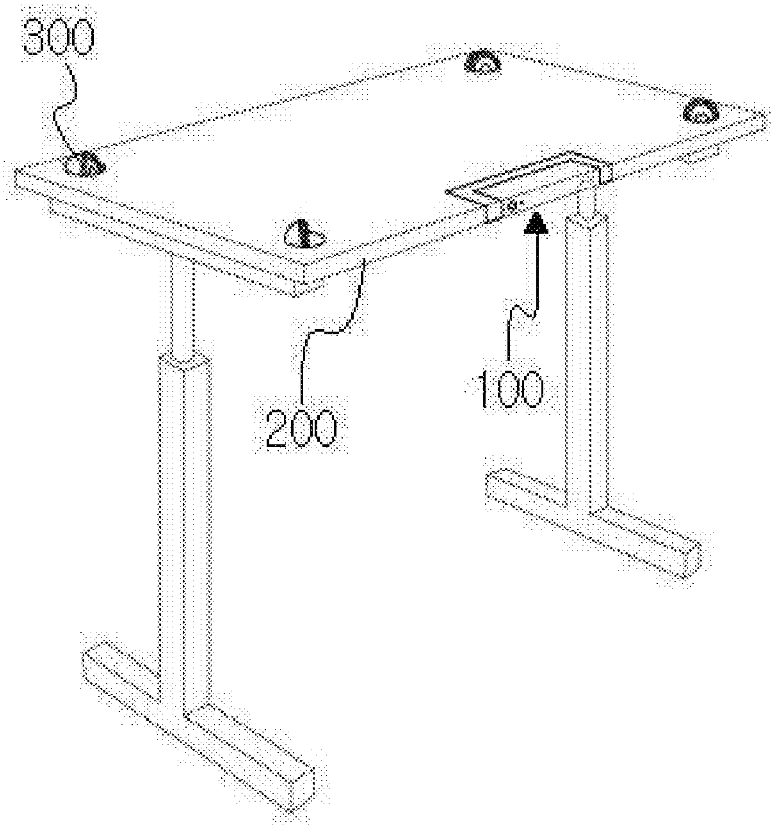
FIGS. 12 and 13 are perspective views illustrating a table, in which a lighting device for a table according to the inventive concept is installed.
Figure 13:
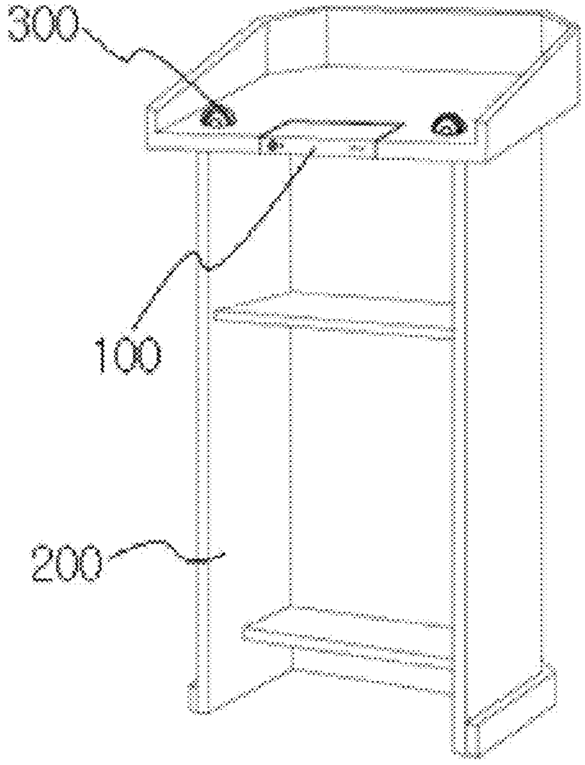

FIGS. 12 and 13 are perspective views illustrating a table, in which the lighting device for a table according to the inventive concept is installed.

Referring to FIGS. 12 and 13, the table according to the inventive concept is used as a filming prop for photographing an image, and may be used as a solo media table or a lecture table while providing a function of irradiating light to a vicinity of the neck of a lighting object during filming.

The table includes a table body 200 having an insertion hole on a front surface thereof and an assembling recess communicated with the insertion hole, the housing 110 that is inserted into the insertion hole and has a light transmitting surface, the lighting part 120 that irradiates the light in an interior of the housing 110, the power source part 130 that is exposed to an outside or the housing 110 to control turning-on/off the lighting part 120 according to the turning-on/off signal of the lighting part, the brightness adjusting part 140 that is exposed to the outside of the housing 110 to control the lighting intensity of the lighting part 120 according to a brightness adjusting signal of the lighting part, and the adapter part 150 having cylindrical bosses provided at opposite distal ends of the housing 110 such that the housing 110 is rotated while being inserted into the assembling recess formed in the table body 200, and includes an auxiliary lighting device 300 that is selectively installed on an upper surface of the table body 200 to irradiate light to the lighting object.

The lighting device 100 for a table, which is provided in the table of the inventive concept has the same configuration as that of the above-described lighting device 100 for a table, and a repeated description thereof will be omitted.

According to the inventive concept, because light may be limitedly irradiated to a vicinity of the neck below the eyes of a lighting object in the table, which is lower than the field of views of the lighting object when light is shined toward a table, it is possible to prevent glare from the lighting object due to lighting, and to prevent shadows in the vicinity of the neck due to lighting device installed on the ceiling.

In addition, according to the inventive concept, an image of a lighting object may be improved and a quality of video contents may be improved because uniform lighting brightness is formed on the body of the lighting object.

In addition, because the inventive concept may be easily attached and detached from a table when being made in a detachable form, it may be detached from the table and stored safely when not filming a video, and may be applied to various tables.

Although the preferred embodiments of the inventive concept have been described, an ordinary person skilled in the art, to which the inventive concept pertains, may understand that the inventive concept may be variously corrected and changed without departing from the spirits and areas of the inventive concept, which are described in the following claims.

What is claimed is:

1. A lighting device for a table, comprising:

a housing having a light transmitting surface which light transmits, having a lighting seating recess divided into three or more transverse rows such that brighter light is irradiated to a shadow intensive area, formed to have an inner area, in which a first row of lighting seating recess is smaller than a second row of lighting seating recess, and formed to have an inner area, in which the second row of light seating recess is smaller than a third row of lighting seating recess;

a lighting part installed in an interior of the housing, and configured to irradiate light toward a vicinity of a neck, which is below the eyes of a lighting object to remove a shade formed at the vicinity of the neck of the lighting object;

a power source part installed in the housing, and configured to receive a turning-on/off signal of the lighting part to turn on and off the lighting part;

a brightness adjusting part installed in the housing, and configured to receive a brightness adjusting signal of the lighting part to adjust a lighting intensity of the lighting part; and an adapter part installed in the housing, and coupling the housing to the table.

2. The lighting device of claim 1, wherein the adapter part is cylindrical bosses provided at opposite distal ends of the housing such that the housing is rotated while being inserted into an assembling recess formed in the table.

3. The lighting device of claim 2, wherein the housing is formed to have a cylindrical structure, the power source part is installed at one end of the housing, and the brightness adjusting part is installed at an opposite end of the housing, which is opposite to the one end.

4. The lighting device of claim 3, wherein the adapter part includes:

a first coupling ring mounted to surround an outer peripheral surface of the housing;

a first attachment plate fixed to the first coupling ring and having a flat plate structure to be attached to the table;

a first assembling means coupling the first attachment plate to the table such that the first attachment plate is fixed to the table;

a second coupling ring spaced apart from the first coupling ring and mounted to surround the outer peripheral surface of the housing;

a second attachment plate fixed to the second coupling ring and having a flat plate structure to be attached to the table; and a second assembling means coupling the second attachment plate to the table such that the second attachment plate is fixed to the table.

5. The lighting device of claim 1, wherein the lighting part is a flexible LED board, and the adapter part is an adhesion tape.

6. The lighting device of claim 1, further comprising:

a color adjusting part installed in the housing, and configured to receive a color changing signal of the lighting part to change a color of the lighting part.

7. The lighting device of claim 1, further comprising:

a DMX connector installed in the housing, and connected to a lighting controller by wire or wirelessly to transmit a control signal of the lighting controller to the lighting part.

8. The lighting device of claim 1, further comprising:

a shade managing part installed in the housing to detect a shade formed in an input surface of the light irradiated from the lighting part, and configured to adjust a lighting intensity of the lighting part according to a brightness of the input surface.

9. A table, in which the lighting device of claim 1 is installed.

* * * * *